April 1, 1924.
H. P. SACHSE
MOUNTING FOR BEARINGS
Filed Oct. 17, 1921
1,488,713
2 Sheets-Sheet 1
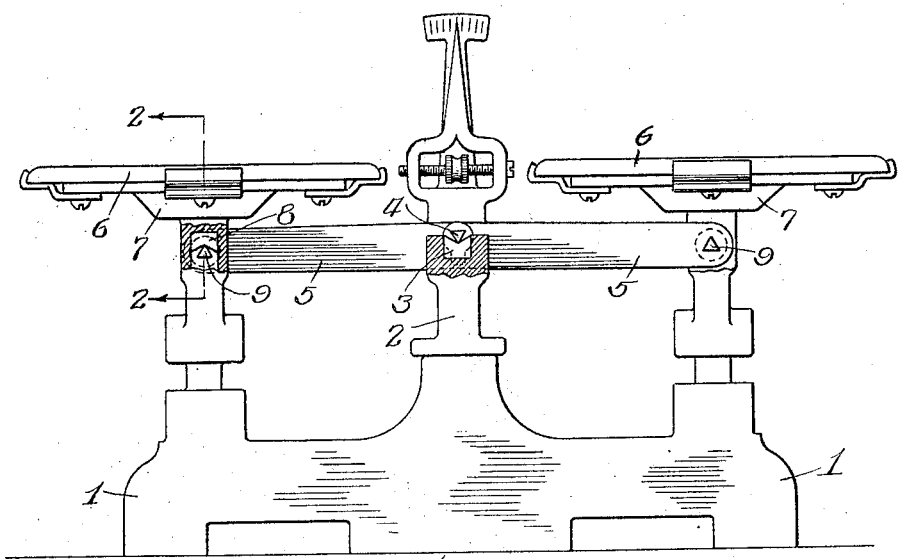
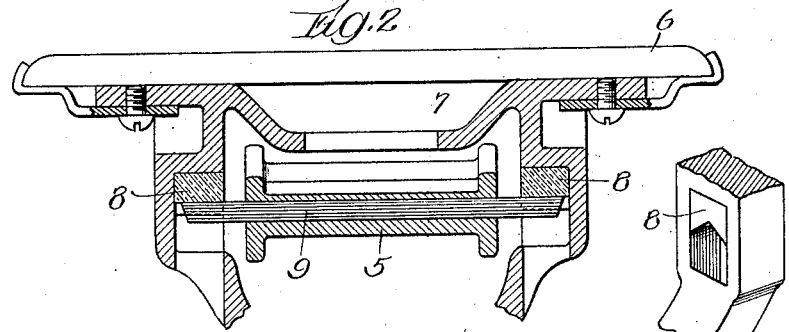
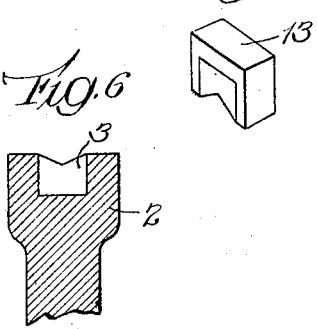
Inventor
Herman Paul Sachse
By Wm O Beet
Atty.

April 1, 1924.
H. P. SACHSE
MOUNTING FOR BEARINGS
Filed Oct. 17, 1921    2 Sheets-Sheet 2
1,488,713
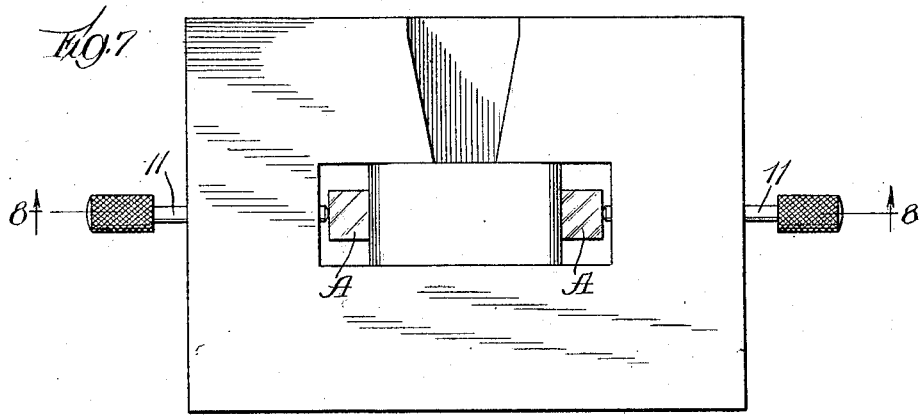
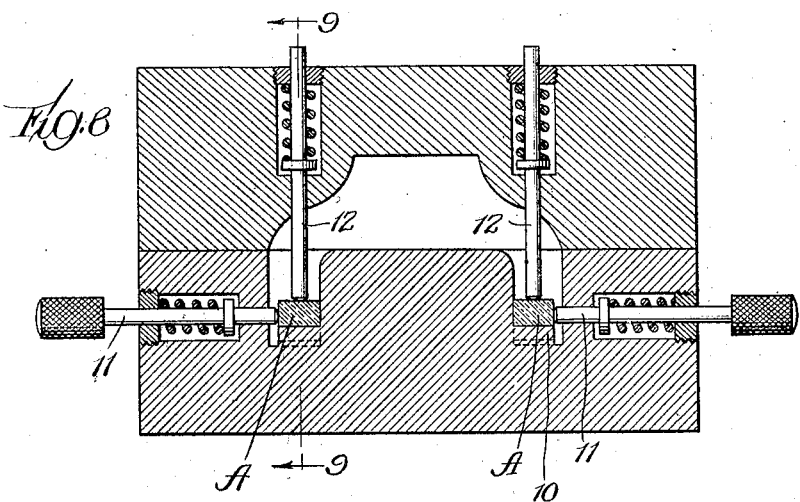
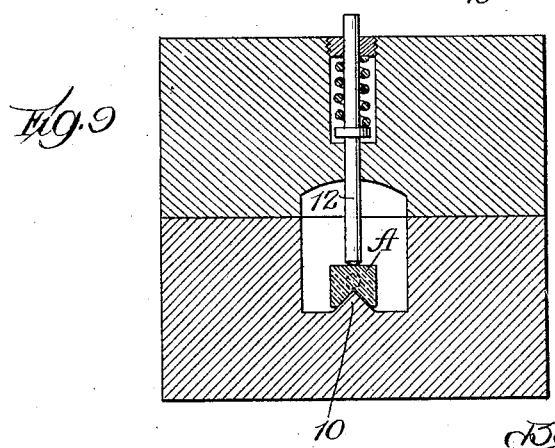
Inventor
Herman Paul Sachse
By Wm O Bell
Atty.

Patented Apr. 1, 1924.

1,488,713

UNITED STATES PATENT OFFICE.

HERMAN PAUL SACHSE, OF CHICAGO, ILLINOIS, ASSIGNOR TO CENTRAL SCIENTIFIC COMPANY, OF CHICAGO, ILLINOIS, A CORPORATION OF ILLINOIS.

MOUNTING FOR BEARINGS.

Application filed October 17, 1921. Serial No. 508,295.

*To all whom it may concern:*

Be it known that I, HERMAN PAUL SACHSE, a citizen of the United States, residing at Chicago, in the county of Cook and State of Illinois, have invented certain new and useful Improvements in Mountings for Bearings, of which the following is a specification.

Heretofore it has been customary to mount the hard bearings on which the knife-edge supports of balances and the like rest, by cementing them in sockets in the supporting frame. On account of the exact nicety of alignment required it has been necessary to employ highly skilled labor for this work and to supply specially designed and accurately constructed jigs and fixtures with which to locate and sustain the bearings in place while the cementing was accomplished.

The object of this invention is to avoid this expensive procedure by an operation which brings this specialized work within the abilities of the ordinary mechanic.

A further object of the invention is to accurately and properly mount the bearings in the cast frame or support whereby there is no possibility of the bearings becoming loose or getting out of alignment. Further objects will become apparent as the description is read in connection with the accompanying drawing in which—

Fig. 1 is a side elevation of an ordinary balance scale with my invention applied thereto, certain parts being broken away to better illustrate details of the bearings;

Fig. 2 is a sectional view on the line 2—2 of Fig. 1;

Figs. 3, 4 and 5 are perspective views illustrating details of the invention;

Fig. 6 is a section of a fragment of one of the main supports;

Fig. 7 is a plan view of the bottom section of a mold which I have used successfully;

Fig. 8 is a longitudinal section through the mold illustrating the means for holding the bearings in place;

Fig. 9 is a transverse sectional view on the line 9—9 of Fig. 8.

I have illustrated the invention in connection with an ordinary balance scale, but it is understood that I do not wish to be limited thereby.

In the drawings, reference numeral 1 indicates the base of the scale having an upright 2 carrying the bearings 3 for the knife-edges 4 of the beam 5. 6 indicates the pans supported by the hangers 7 carrying the bearings 8 resting on the knife-edges 9 secured to the ends of the beam 5. The agate bearings 3 and 8 referred to are inserted in the molds for the uprights 2 and the hangers 7 and cast directly in place.

In Figs. 7, 8 and 9 I have illustrated by way of example one form of mold equipped with means for sustaining the agates in place during casting. By referring to these figures it will be seen that the molds have suitable pyramidal supports 10 to receive the bearing face of the agates A which are held in place by the spring-pressed plungers 11 and 12. By these means it will be apparent that anyone can place the agates on the supports in perfect alignment and that they will be held in this position by the spring-pressed plungers until the frame has been cast about them.

Under some conditions it may not be desirable to attempt to cast the agate directly in the metal of the support. In such cases I prefer to cast a small adapter 13 about the agate and either press this adapter into a suitable socket in the support, or use the agate with an adapter as an insert in the mold and cast the support about it. This procedure is particularly useful where the frame is made of metal having a very high melting point, for while the agate will probably resist the heat of the melting temperature of any metal that may be used in the frame, the stresses set up by the unequal temperatures in the agate will sometimes produce cracking. By interposing between the high temperature metal and the agate and adapter of metal having a lower melting point, breakage from this cause can be effectually eliminated. In some cases, the agate equipped with an adapter can be fitted or pressed into a suitable socket in the frame with much less difficulty than the bare agate can be cemented in the frame. With this construction the agate can be much more readily removed than when cast directly in the metal scale element. Another great advantage attending the use of the adapter is that the size of the bearing units can be made uniform, which is impractical with the bare agates.

While I have referred to the bearings 3, 8 and A as agates, I of course, do not intend to limit the invention to use with blocks of that material, as bearings may be made of flint, steel, tungsten, illium, molybdenum, and a number of other materials having the requisite hardness.

From the foregoing it will be clear to those skilled in the art that by the procedure described, the apex of the notch in the usual hardened bearings for knife-edges can be accurately placed and aligned without the use of highly skilled labor or special appliances for holding the parts during cementing.

I am aware that changes in the form and proportion of parts, and in the details of construction of my invention may be made without departing from the spirit or sacrificing any of the advantages thereof, and I reserve the right to make all such changes as fairly fall within the scope of the following claims.

I claim:

1. In a device of the class described, a bearing for knife-edges comprising a hard block cast in an adapter of metal having a low melting point, and seated in a frame of metal having a high melting point.

2. In a device of the class described, a bearing for knife edges comprising a hard block cast in an adapter of metal having a low melting point, and cast in a frame of metal having a high melting point.

3. In a device of the class described, a bearing for knife-edges cast in place in a metal frame.

4. In a device of the class described, agate bearings for knife-edges held in position by metal cast about said bearings.

5. The process of mounting bearings for knife-edges which consists of assembling the bearings in place as inserts in a mold, and casting the metal about them.

6. The process of mounting agate bearings which consists in casting an adapter about said bearings and seating said adapter in a metal frame.

7. The process of mounting agate bearings, which consists in casting an adapter around a bearing, and then casting said adapter in a metal frame.

HERMAN PAUL SACHSE.